(12) United States Patent
Yamaguchi

(10) Patent No.: US 9,363,420 B2
(45) Date of Patent: Jun. 7, 2016

(54) COLOR CONVERSION METHOD, COLOR CONVERSION PROGRAM, AND RECORDING MEDIUM

(71) Applicant: KONICA MINOLTA, INC., Tokyo (JP)

(72) Inventor: Takeshi Yamaguchi, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/814,729

(22) Filed: Jul. 31, 2015

(65) Prior Publication Data

US 2016/0044211 A1      Feb. 11, 2016

(30) Foreign Application Priority Data

Aug. 7, 2014   (JP) ................................. 2014-161781

(51) Int. Cl.
| | |
|---|---|
| *G06K 15/00* | (2006.01) |
| *H04N 1/40* | (2006.01) |
| *H04N 1/60* | (2006.01) |
| *H04N 1/00* | (2006.01) |

(52) U.S. Cl.
CPC ......... *H04N 1/6072* (2013.01); *H04N 1/00724* (2013.01); *H04N 1/00726* (2013.01); *H04N 1/00769* (2013.01); *H04N 1/00774* (2013.01)

(58) Field of Classification Search
USPC .................................................. 358/1.1–1.18
See application file for complete search history.

(56) References Cited

U.S. PATENT DOCUMENTS

| | | | | |
|---|---|---|---|---|
| 8,537,441 | B2 * | 9/2013 | Namikata | .................... 358/518 |
| 9,030,710 | B2 * | 5/2015 | Nakamura | .................... 358/1.9 |

FOREIGN PATENT DOCUMENTS

JP        2008-278152 A        4/2007

* cited by examiner

*Primary Examiner* — Douglas Tran

(74) *Attorney, Agent, or Firm* — Baker & Hostetler LLP

(57) ABSTRACT

A color conversion method includes: a step (a) of obtaining paper white information including a spectral reflectance and a scanner response value of a paper white portion of a document, a step (b) of searching for a registered scanner profile corresponding to paper white information the same as or similar to the paper white information, from a plurality of registered scanner profiles for paper types, and a step (c) of determining whether a new scanner profile needs to be created corresponding to the paper white information obtained in the step (a), according to a result of searching in the step (b).

11 Claims, 13 Drawing Sheets

COLOR CONVERSION METHOD, COLOR CONVERSION PROGRAM, AND RECORDING MEDIUM

The entire disclosure of Japanese Patent Application No. 2014-161781 filed on Aug. 7, 2014 including description, claims, drawings, and abstract are incorporated herein by reference in its entirety.

BACKGROUND OF THE INVENTION

1. Field of the Invention

The present invention relates to a color conversion method, a color conversion program, and a recording medium.

2. Description of the Related Art

Recent years, in an image forming apparatus, when data is transmitted and received between different image processing devices, color conversion processing is often performed to secure color reproducibility. For example, in the transmission and reception of data between a scanner and a printer, a scanner response value (e.g., RGB values) is converted to a colorimetric value not depending on an image processing device, such as XYZ values or L*a*b* values, and then converted to an output value of the printer (e.g., CMYK value). Such a color conversion processing is performed, using a color conversion profile recording a correspondence relationship between the RGB values or the CMYK value depending on the image processing device, the XYZ values or the L*a*b* values not depending on the image processing device.

Generally, the color conversion profile is dedicatedly prepared for individual image processing device, for example as a color conversion profile for a scanner or a color conversion profile for a printer. Hereinafter, the color conversion profile for a scanner is referred to as a "scanner profile", in the present specification. The scanner profile is a color conversion profile for holding, for example, a correspondence relationship between the RGB values and the XYZ values for a paper type of a document to be read by a scanner.

However, it is not realistic to previously prepare the scanner profiles for all types of paper used by a user, because the scanner profiles require a large-capacity storage device. Therefore, it can be considered that for example, a scanner profile is prepared only for a paper type frequently used, and an additional scanner profile of another paper type is created each time when needed. However, in order to create a scanner profile, it is necessary to output and measure color patches including combinations of C, M, Y, and K, and associate the RGB values with the XYZ values of the scanner. Therefore, there have been problems that the processing requires time, and an amount of paper used is increased.

In connection with the scanner profile, an image processing system is disclosed in JP 2008-278152 A. The image processing system is configured to search for a color conversion profile for a printer (hereinafter, referred to as "printing profile") corresponding to a paper type closest to that of a document from printing profiles prepared for paper types. More specifically, the image processing system is configured to measure a paper white portion of the document by a spectrophotometer to search for a paper type closest to the paper type of the document from the paper types specified by a manufacturer, and select the printing profile corresponding to the paper type closest to the paper type of the document.

However, even if the spectrophotometer determines that the measured paper white portion has the same paper type, since glossiness or the like changes according to a difference between optical systems, the scanner response value may differ. Accordingly, even if the image processing system is configured to select a scanner profile corresponding to the paper type closest to the paper type of the document, based on a result of measurement of the paper white portion of the document by the spectrophotometer, the scanner profile may be inappropriately selected. Therefore, there is a possibility that the color reproducibility cannot be satisfactorily secured in color conversion processing.

SUMMARY OF THE INVENTION

The present invention has been made to solve the abovementioned problems. Accordingly, an object of the invention is to provide a color conversion method, a color conversion program, and a recording medium with which color reproducibility can be satisfactorily secured in color conversion processing, while inhibiting the increase of a processing time for creation of a scanner profile.

The object of the present invention is achieved by the followings:

(1) To achieve the abovementioned object, according to an aspect, a color conversion method reflecting one aspect of the present invention comprises a step (a) of obtaining paper white information including a spectral reflectance and a scanner response value of a paper white portion of a document, a step (b) of searching for a registered scanner profile corresponding to paper white information the same as or similar to the paper white information, from a plurality of registered scanner profiles for paper types, and a step (c) of determining whether a new scanner profile needs to be created corresponding to the paper white information obtained in the step (a), according to a result of searching in the step (b).

(2) The color conversion method according to Item. 1, in which the step (b) preferably further includes calculating a paper white approximation degree representing an approximation degree of each of the spectral reflectance and the scanner response value obtained in the step (a) with respect to a spectral reflectance and a scanner response value associated with the registered scanner profile, and comparing the paper white approximation degree and a predetermined paper white approximation degree threshold, and selecting the registered scanner profile when the paper white approximation degree is not more than the predetermined paper white approximation degree threshold.

(3) The color conversion method according to Item. 2, in which, in the step (c), when no registered scanner profile is selected in the step (b), it is preferably determined that a new scanner profile needs to be created corresponding to the spectral reflectance and the scanner response value obtained in the step (a).

(4) The color conversion method according to Item. 2, in which in the step (c), a scanner profile having a minimum paper white approximation degree is preferably selected from scanner profiles of paper types having the paper white approximation degrees not more than the predetermined paper white approximation degree threshold.

(5) The color conversion method according to any one of Items. 2 to 4, in which in the step (a), a spectral reflectance and a scanner response value of a color patch portion of a color chart are preferably further obtained in addition to the spectral reflectance and the scanner response value of the paper white portion, and the step (c) preferably includes a step of converting the scanner response value obtained in the step (a) to a colorimetric value, using the registered scanner profile selected in the step (b), and a step of confirming whether the new scanner profile needs to be created, based on a magnitude of a color difference calculated between the colorimetric value and a colorimetric value calculated based on the spectral reflectance obtained in the step (a).

(6) The color conversion method according to Item. 5, in which the step of confirming whether the new scanner profile needs to be created, preferably includes calculating an average value between the color differences for a plurality of the color patch portions, and comparing the average value between the color differences and a predetermined color patch threshold, and determining that the new scanner profile does not need to be created, when the average value between the color differences is not more than the color patch threshold.

(7) The color conversion method according to any one of Items. 1 to 6, preferably further including a step (d) of creating anew scanner profile corresponding to the spectral reflectance and the scanner response value of the paper white portion, obtained in the step (a), when it is determined that a scanner profile needs to be created, in the step (c).

(8) The color conversion method according to Item. 7, preferably further including a step (e) of registering the created scanner profile corresponding to the spectral reflectance and the scanner response value of the paper white portion, after the step (d).

(9) The color conversion method according to any one of Items. 6 to 8, in which the step (c) preferably further includes adjusting the paper white approximation degree threshold and the color patch threshold according to the paper white approximation degree and the average value between the color differences.

(10) The color conversion method according to any one of Items. 2 to 9, in which the paper white approximation degree is preferably calculated by summing up differences between the spectral reflectance obtained in the step (a) and the spectral reflectance associated with the registered scanner profile for each wavelength.

(11) A non-transitory recording medium storing a computer readable color conversion program for preferably causing an image forming apparatus to perform the color conversion method according to any one of Items. 1 to 10.

(12) A computer-readable recording medium preferably recording the color conversion program according to Item. 11.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples. It is noted that, in the description of the drawings, the same elements are denoted by the same reference signs, and the overlapping description will be omitted.

First Embodiment

Figure 1:
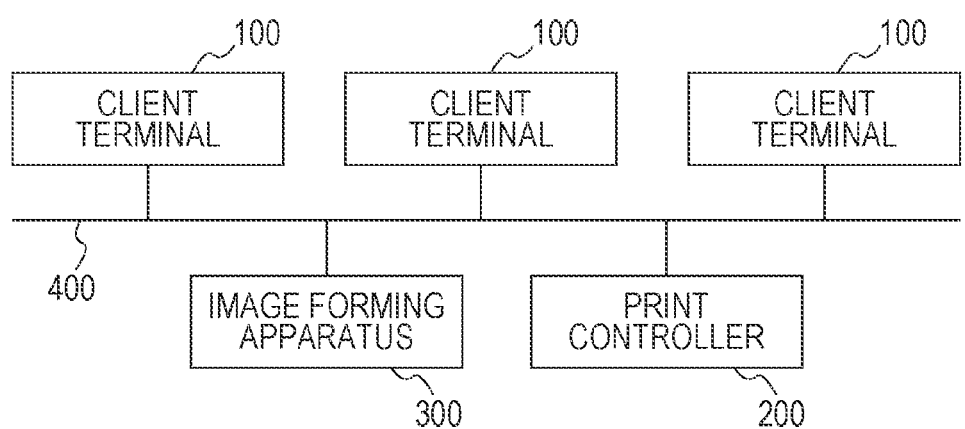
FIG. 1 is a schematic block diagram illustrating a configuration of an image forming system according to a first embodiment of the present invention.
Figure 2:
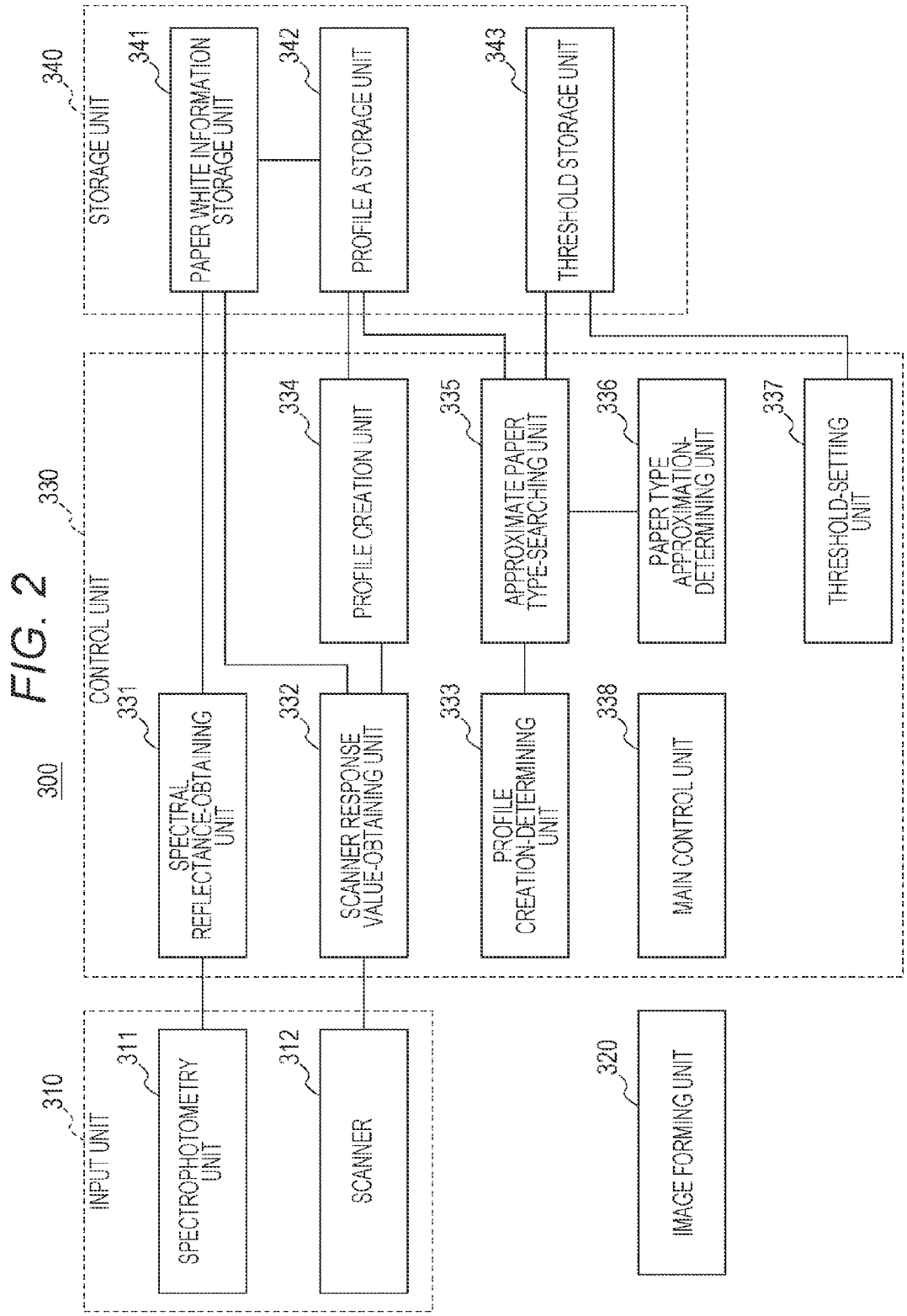
FIG. 2 is a schematic block diagram illustrating a configuration of an image forming apparatus of FIG. 1.
Figure 3:
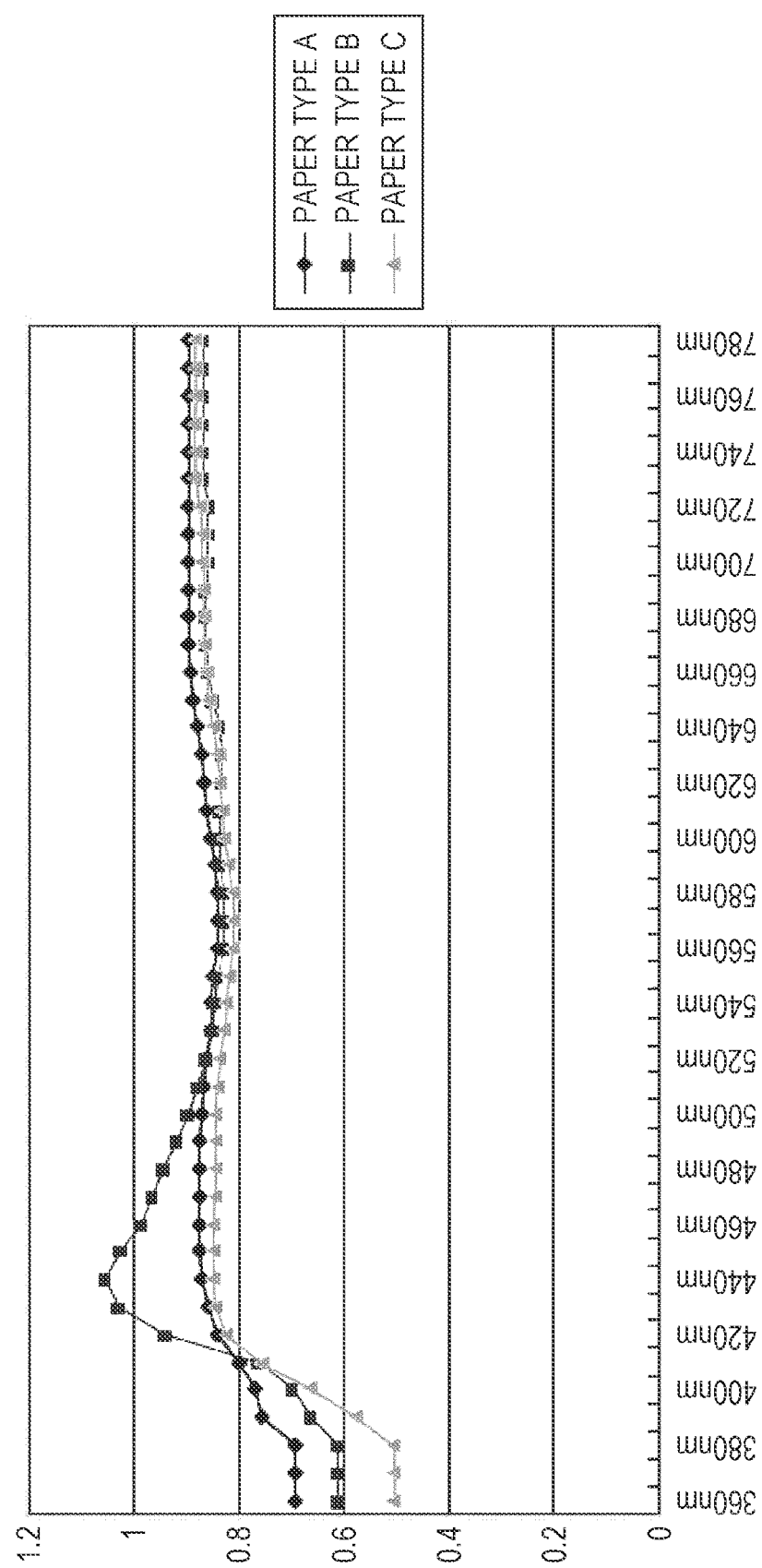
FIG. 3 is a graph exemplifying a result of measurement of spectral reflectances of different three paper types.
Figure 4:
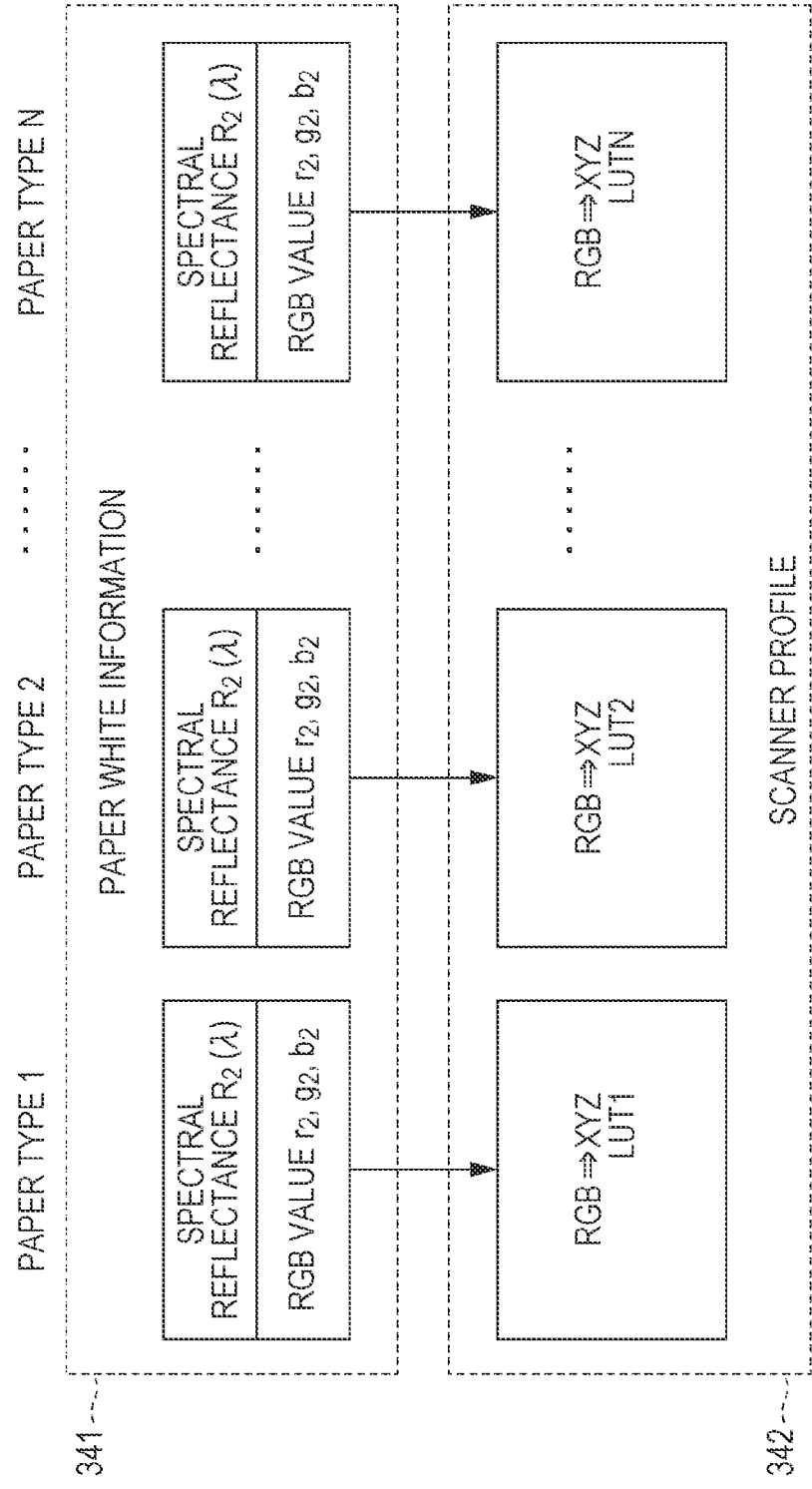
FIG. 4 is a schematic diagram illustrating paper white information and a scanner profile.

FIG. 1 is a schematic block diagram illustrating a configuration of an image forming system according to a first embodiment of the present invention, and FIG. 2 is a schematic block diagram illustrating a configuration of the image forming apparatus of FIG. 1. Further, FIG. 3 is a graph exemplifying a result of measurement of spectral reflectances of different three paper types. In FIG. 3, a horizontal axis represents wavelength, and a vertical axis represents spectral reflectance. FIG. 4 is a schematic diagram illustrating paper white information and a scanner profile.

As illustrated in FIG. 1, the image forming system A according to the present embodiment includes client terminals 100, a print controller 200, and the image forming apparatus 300, and they are communicably connected to each other through a network 400.

The network 400 may include a local area network (LAN) connecting computers or network devices using a communication standard such as Ethernet (registered trademark), a fiber distributed data interface (FDDI), or wireless fidelity (Wi-Fi), a wide area network (WAN) connecting LANs using a dedicated line, or the like.

The client terminal 100 is for example a personal computer (PC), generates a print job, and transmits the print job to the print controller 200. The print job is job data for causing the image forming apparatus 300 to print an image, and has print setting information (also referred to as job ticket) including image data and information about various setting required for printing the image data.

The print setting information includes information, for example, a sheet size, a paper type, duplex printing, or a post-processing setting. A user can use the printer driver operated on the client terminal 100 to confirm contents of print setting or partially changing the contents of the setting.

Further, the image data can be created by the user using application software such as word-processing software operated on the client terminal 100. It is noted that, FIG. 1 exemplifies three client terminals 100 connected to the network 400, but the number of the client terminals 100 is not limited to three.

The print controller 200 generates data of an image to be printed, and transmits the data of an image to be printed to the image forming apparatus 300. The print controller 200 analyzes the print job, performs processing such as color conversion, screening, and rasterization, and generates bit map data of an image to be printed. Color conversion processing is performed based on an international color consortium (ICC) device profile. It is noted that FIG. 1 exemplifies the print controller 200 and the image forming apparatus 300 connected through the network 400, but the print controller 200 and the image forming apparatus 300 may be connected through a dedicated line such as peripheral component interconnect (PCI).

The image forming apparatus 300 receives the data of an image to be printed, and prints an image. As illustrated in FIG. 2, the image forming apparatus 300 includes an input unit 310, an image forming unit 320, a control unit 330, and a storage unit 340.

The input unit 310 includes a spectrophotometry unit 311 and a scanner 312, and transmits a spectral reflectance and a scanner response value to the control unit 330.

The spectrophotometry unit 311 includes a spectrophotometer, irradiates a paper white portion of the document with light, and measures reflectance or spectral reflectance of the paper white portion at each wavelength, based on light reflected from the paper white portion. As illustrated in FIG. 3, in a visible light range (360 to 780 nm), a paper type A and a paper type C of three paper types A, B, and C have spectral reflectances similar to each other in magnitude at each wavelength. Accordingly, in the present embodiment, the paper type A and the paper type C can be determined to have at least similar paper types. Whereas, the paper type B contains a fluorescent brightener, so that the paper type B has a spectral reflectance significantly separated from those of the paper type A and the paper type C at around a wavelength of 440 nm. Accordingly, the paper type B is not considered to be similar to the paper type A and the paper type C.

The spectrophotometry unit 311 is disposed at a position along a document conveying path, and measures the spectral reflectance in the paper white portion of the document conveyed on the conveying path. In the present embodiment, the spectrophotometer preferably has a configuration for measuring the spectral reflectance of at least a small area of the paper white portion of the document. Further, the document can be a sheet including at least the paper white portion at a predetermined position. The document may be a "blank sheet".

The scanner 312 includes a line sensor, and the line sensor is adjacent to the spectrophotometry unit 311, and has a longitudinal direction disposed to be parallel with a sheet width direction being a direction perpendicular to a sheet conveying direction. The scanner 312 reads an image on the paper white portion of the document conveyed on the conveying path, and obtains a response value (e.g., RGB values) of each pixel of the image.

The image forming unit 320 prints an image to be printed based on the data of an image to be printed. The image forming unit 320 uses a known image forming process such as an electrophotographic process to form an image on a sheet with four color toners C, M, Y, and K based on the data of an image to be printed, received from the print controller 200.

The control unit 330 controls the input unit 310 and the image forming unit 320. The control unit 330 includes a spectral reflectance-obtaining unit 331, a scanner response value-obtaining unit 332, a profile creation-determining unit 333, a profile creation unit 334, an approximate paper type-searching unit 335, a paper type approximation-determining unit 336, a threshold-setting unit 337, and a main control unit 338.

The storage unit 340 includes a paper white information storage unit 341, a profile storage unit 342, and a threshold storage unit 343. The paper white information storage unit 341 stores paper white information including the spectral reflectance and the scanner response value. Further, the profile storage unit 342 stores the scanner profile. Further, the threshold storage unit 343 stores a threshold of a paper white approximation degree (hereinafter, also simply referred to as "threshold").

As illustrated in FIG. 4, the paper white information includes the spectral reflectance and the scanner response value (RGB values) of each of a plurality of paper types 1, 2, ... N to be stored in association with a corresponding scanner profile. The scanner profile is a color conversion profile holding a correspondence relationship between the scanner response value (RGB values) and a colorimetric value (XYZ values, L*a*b* values, or the like) in the lookup table (LUT) form. Hereinafter, the scanner profile will be simply referred to as a "profile".

A configuration of the control unit 330 will be described again with reference to FIG. 2. The spectral reflectance-obtaining unit 331 controls the spectrophotometry unit 311 to measure and obtain the spectral reflectance of the paper white portion of the document.

The scanner response value-obtaining unit 332 controls the scanner 312 to read the paper white portion of the document, and obtains the scanner response value.

The profile creation-determining unit 333 determines whether a new profile needs to be created based on a result of searching for a registered profile performed by the approximate paper type-searching unit 335.

The profile creation unit 334 creates the new profile corresponding to the obtained spectral reflectance and scanner response value, according to a determination result of the profile creation-determining unit 333.

The approximate paper type-searching unit 335 searches for a paper type profile closer to a paper type of the document, from a plurality of profiles registered in the profile storage unit 342. More specifically, the approximate paper type-searching unit 335 searches for a registered profile corresponding to the spectral reflectance and the scanner response value approximate to each of the obtained spectral reflectance and scanner response value, based on a determination result of the paper type approximation-determining unit 336.

The paper type approximation-determining unit 336 compares the spectral reflectance obtained by the spectral reflectance-obtaining unit 331 and the spectral reflectance of the paper white information storage unit 341, and determines an approximation degree between both spectral reflectance.

More specifically, the paper type approximation-determining unit 336 calculates a paper white approximation degree A1 representing an approximation degree between them, and determines whether both of them are the same as or similar to each other, based on whether the paper white approximation degree A1 is not more than a predetermined threshold Th1.

In the present embodiment, the paper white approximation degree A1 can be calculated, for example, by the following mathematical formula (1). In the mathematical formula (1), $R1(\lambda)$ represents the spectral reflectance of the paper white portion obtained by the spectral reflectance-obtaining unit 331, and $R2(\lambda)$ represents the spectral reflectance stored in the paper white information storage unit 341 and associated with the registered profile. Further, λ represents a wavelength, and can be added for example every 10 nm. The paper white approximation degree A1 represents an average of a difference between the spectral reflectances in the visible light range of 360 to 780 nm, and as the paper white approximation degree A1 has a smaller value, the spectral reflectances have higher an approximation degree. It is noted that the threshold Th1 preferably has, for example, approximately 0.05.

The wavelength λ may be weighted using a color-matching function to adjust an influence caused by a difference between paper types according to the wavelength λ. For example, it is known that the color-matching function has a value closer to 0 when the wavelength λ is less than 400 nm. Accordingly, by using the color-matching function, the influence caused by a difference between the paper types at a wavelength λ of less than 400 nm is substantially negligible.

[Mathematical Formula 1]

$$A1 = \sum_{\lambda=360\,nm}^{780\,nm} \{|R_1(\lambda) - R_2(\lambda)|\} \quad (1)$$

Further, the paper type approximation-determining unit 336 compares the scanner response value obtained by the scanner response value-obtaining unit 332 and a scanner response value of the paper white information storage unit 341, and determines a an approximation degree between both of the scanner response values. More specifically, the paper type approximation-determining unit 336 calculates a paper white approximation degree A2 representing a an approximation degree between both of the scanner response values, and determines whether the paper white approximation degree A2 is not more than a predetermined threshold Th2.

In the present embodiment, the paper white approximation degree A2 is obtained, for example, by calculating the Euclidean distance between the RGB values expressed in the following mathematical formula (2). In mathematical formula (2), $r_1$, $g_1$, and $b_1$ are RGB values of the paper white portion obtained by the scanner response value-obtaining unit 332, the $r_2$, $g_2$, and $b_2$ are RGB values of the paper white portion which are stored in the paper white information storage unit 341, and associated with the registered profile. It is noted that the threshold Th2 is preferably for example approximately 10.

[Mathematical Formula 2]

$$A2 = \sqrt{(r_1-r_2)^2 + (g_1-g_2)^2 + (b_1-b_2)^2} \quad (2)$$

The threshold-setting unit 337 sets the threshold Th1 and the threshold Th2. The set thresholds Th1 and Th2 are stored in the threshold storage unit 343.

The main control unit 338 controls the spectral reflectance-obtaining unit 331, the scanner response value-obtaining unit 332, the profile creation-determining unit 333, the profile creation unit 334, the approximate paper type-searching unit 335, the paper type approximation-determining unit 336, and the threshold-setting unit 337.

In the present embodiment, the control unit 330 includes a central processing unit (CPU), a read only memory (ROM), a random access memory (RAM), and a hard disk (recording medium) which are not illustrated in the figures. The hard disk stores various software programs, including the color conversion program, and an operating system.

The various software programs are temporarily loaded in the RAM, and are performed by the CPU. Further, the RAM temporarily stores the spectral reflectance and the scanner response value obtained by the spectral reflectance-obtaining unit 331 and the scanner response value-obtaining unit 332, the paper white approximation degrees A1 and A2 calculated by the paper type approximation-determining unit 336, the thresholds Th1 and Th2, or the like. The ROM stores various data or parameters required for performance of the various software programs by the CPU.

The color conversion program is performed by the CPU to achieve each function of the spectral reflectance-obtaining unit 331, the scanner response value-obtaining unit 332, the profile creation-determining unit 333, the profile creation unit 334, the approximate paper type-searching unit 335, the paper type approximation-determining unit 336, the threshold-setting unit 337, and the main control unit 338.

It is noted that each function of the control unit 330 can be also achieved by hardware such as an application specific integrated circuit (ASIC) or a field-programmable gate array (FPGA).

Figure 5:
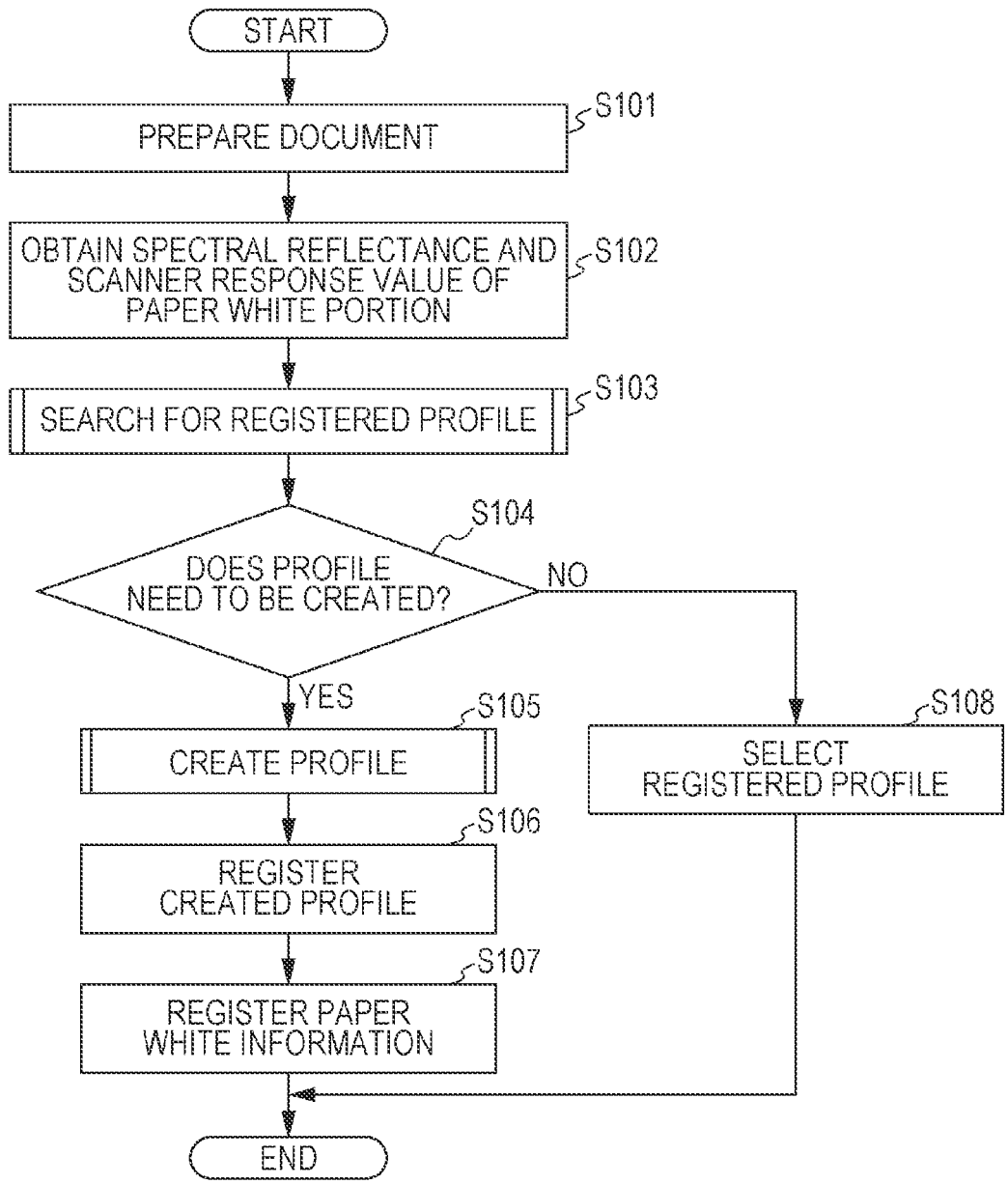
FIG. 5 is a main flowchart illustrating a color conversion method according to the first embodiment of the present invention.

A specific procedure of a color conversion method, performed by the image forming apparatus 300 illustrated in FIG. 2 will be described below with reference to FIGS. 5 to 8. FIG. 5 is a main flowchart illustrating the color conversion method according to the first embodiment of the present invention.

First, a document is prepared (step S101). The main control unit 338 controls a conveyance device (not illustrated) or the like to convey the document to the input unit 310 based on the print setting information received from the print controller 200. It is noted that the document may have a printed image or may be a blank sheet fed from a sheet feeding unit (not illustrated), as long as the paper white portion is included at a predetermined position.

Next, a spectral reflectance and a scanner response value of the paper white portion is obtained (step S102). The spectral reflectance-obtaining unit 331 controls the spectrophotometry unit 311 to obtain the spectral reflectance of the paper white portion of the document. Additionally, the scanner response value-obtaining unit 332 controls the scanner 312 to obtain a scanner response value of the paper white portion of the document.

Next, a registered profile is searched for (step S103). In the present embodiment, the paper white information including the spectral reflectance and the scanner response value is used to search for a registered scanner profile corresponding to paper white information the same as or similar to the used paper white information from a plurality of registered scanner profiles registered for each paper type. A process of searching for a registered profile will be described in detail with reference to subroutine flowcharts of FIGS. 6A and 6B.

Next, it is determined whether a profile needs to be created (step S104). The profile creation-determining unit 333 determines whether a new profile needs to be created corresponding to the paper white information obtained in the step 102, based on a result of searching for a registered profile in the step S103.

When it is determined that the profile does not need to be created (step S104: NO), the registered profile is selected (step S108). The approximate paper type-searching unit 335 selects an optimum profile from a plurality of registered profiles 1 to N. In the present embodiment, for example, a registered profile can be selected which has minimum paper white approximation degrees A1 and A2 in spectral reflectance and scanner response value, respectively. The main control unit 338 reads the selected registered profile, and sets the registered profile to be used for the color conversion processing. Then, the process of the main flowchart ends (END).

Whereas, when it is determined that the profile needs to be created (step S104: YES), the profile creation unit 334 creates the profile (step S105). A method for creating a profile will be described in detail with reference to a subroutine flowchart of FIG. 7.

Next, the created profile is registered (step S106). The profile creation unit 334 registers, as a profile of a new paper type (N+1), the created profile to the profile storage unit 342, corresponding to the obtained spectral reflectance and scanner response value. Then, the registered profile is set to be used for the color conversion processing.

Next, the paper white information is registered (step S107). The obtained spectral reflectance and scanner response value are associated with the registered new profile of the paper type (N+1), and stored in the paper white information storage unit 341. Then, the process of the main flowchart ends (END).

As described above, in the process of the main flowchart of FIG. 5, the spectral reflectance and the scanner response value of the paper white portion of the document are obtained to search for a registered profile having a paper type the same as or similar to the paper type of the document. Then, it is determined whether a new profile needs to be created based on a result of searching for a registered profile. When it is determined that the profile does not need to be created, one registered profile is selected. Whereas, when it is determined that the profile needs to be created, the profile is created. The created profile is registered corresponding to the paper white information.

Figure 6A:
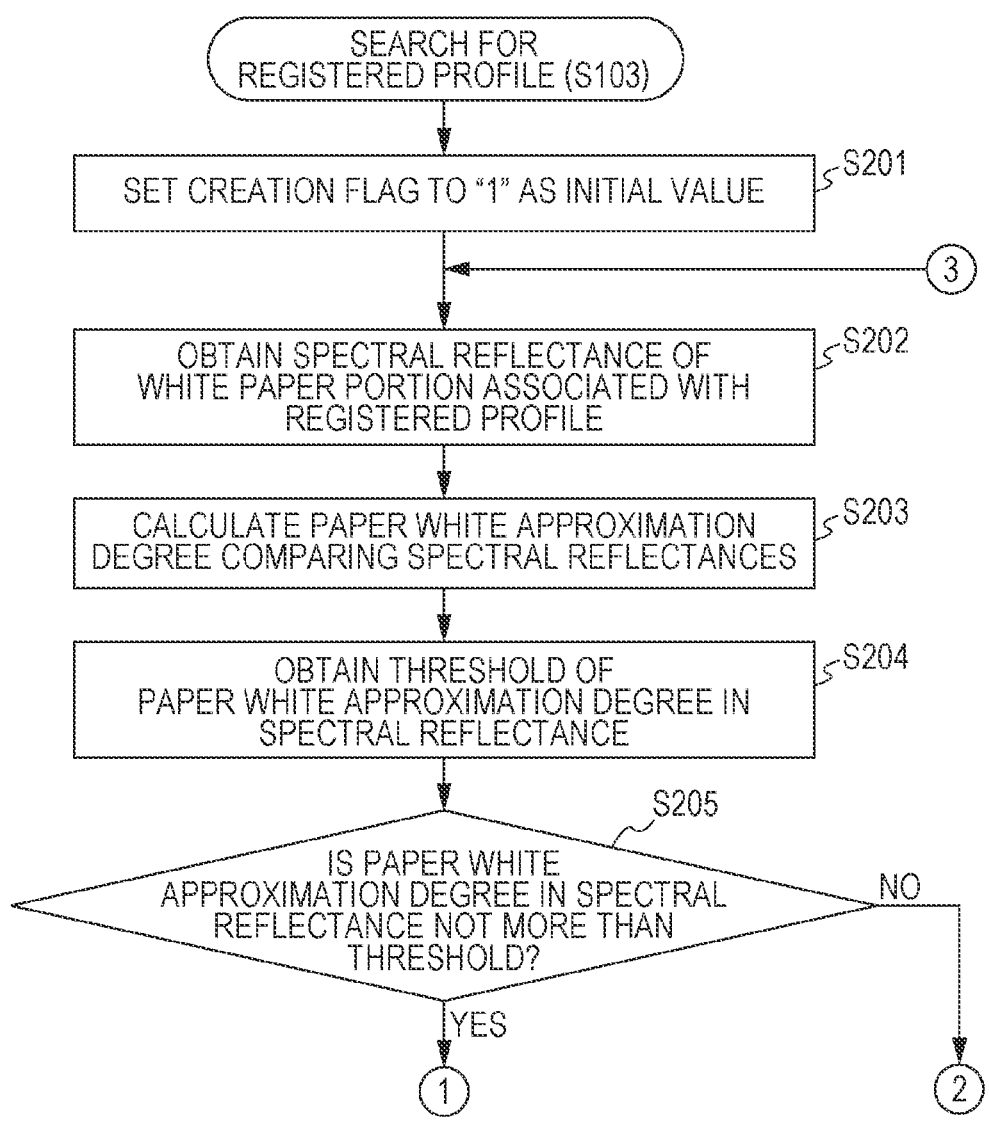
FIG. 6A is a subroutine flowchart of a process (S103) of the main flowchart of FIG. 5, illustrating the process of searching for a registered scanner profile.
Figure 6B:
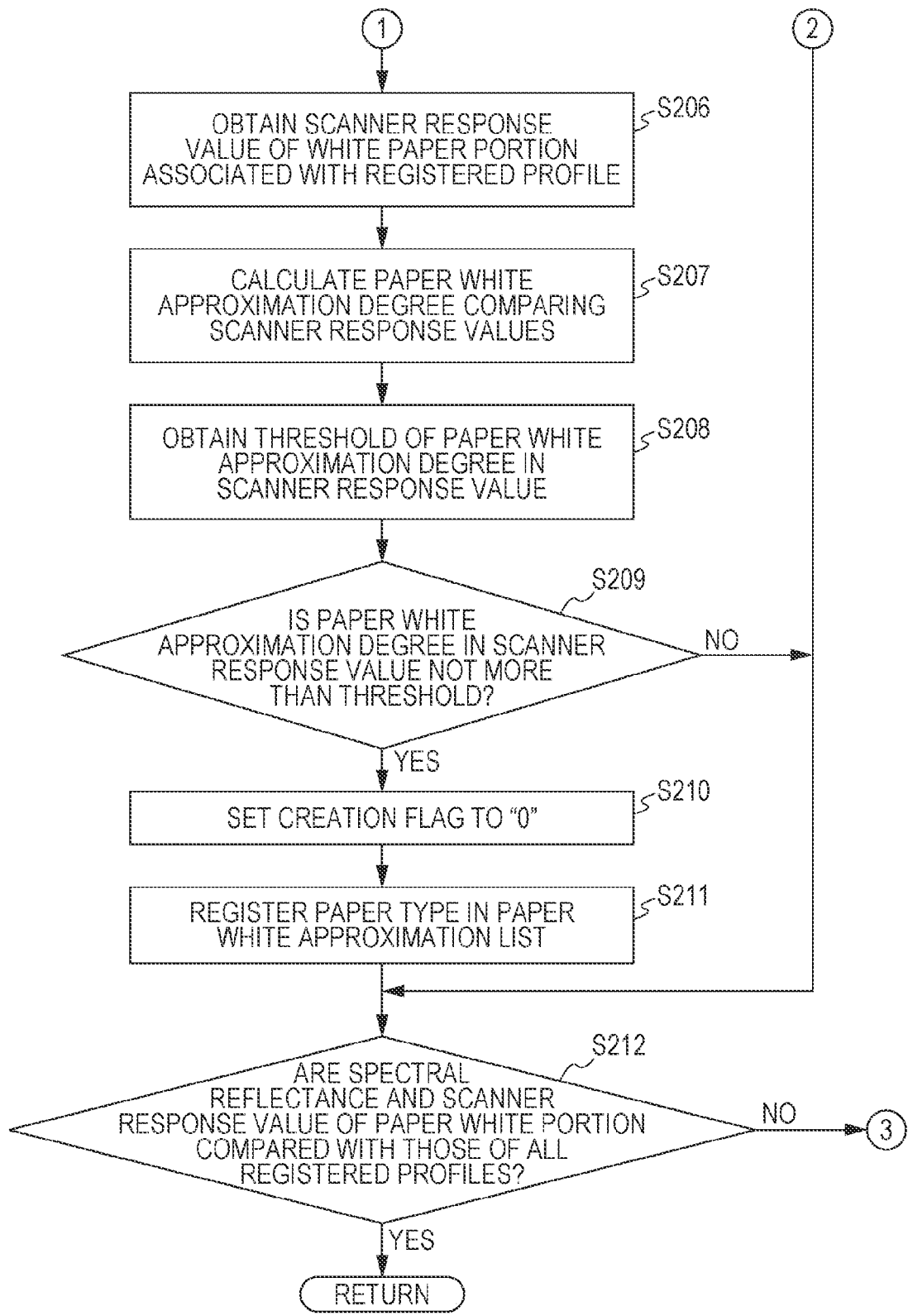
FIG. 6B is a subroutine flowchart following the subroutine flowchart of FIG. 6A.

The process (S103) of searching for a registered profile will be described in detail below with reference to FIGS. 6A and 6B. FIGS. 6A and 6B are a subroutine flowchart of the main flowchart of FIG. 5, illustrating a process (S103) of searching for a registered profile.

As illustrated in FIG. 6A, first, a creation flag is set to "1" as an initial value (step S201). The creation flag is a flag representing whether a profile needs to be created, "1" represents that the profile needs to be created, and "0" represents that the profile does not need to be created. In step S104 of the main flowchart of FIG. 5, the creation flag is used to determine whether the profile needs to be created. As described below, after the creation flag is set to "1" as the initial value, when the registered profile exists which corresponds to the paper type the same as or similar to the paper type of the document, the creation flag is set to "0".

Next, the spectral reflectance of the paper white portion associated with the registered profile is obtained (step S202). The approximate paper type-searching unit 335 selects one from the plurality of registered profile stored in the profile storage unit 342, and obtains the spectral reflectance of the paper white portion associated with the selected registered profile.

In the present embodiment, the registered profiles are selected one by one from the plurality of registered profiles to search for a registered profile having a paper type the same as or similar to the paper type of the document. Here, the order of selecting the registered profiles to be searched is not particularly limited, and for example the registered profiles may be selected in the order of registration of the paper types, or in the order of the paper type 1, paper type 2, . . . paper type N, or may be selected in the order of paper types frequently used.

Next, a paper white approximation degree is calculated comparing the spectral reflectances (step S203). The paper type approximation-determining unit 336 compares the spectral reflectance obtained by the spectral reflectance-obtaining unit 331, and the spectral reflectance associated with the selected registered profile, and calculates the paper white approximation degree A1 in spectral reflectance based on the mathematical formula (1).

Next, a threshold of the paper white approximation degree in spectral reflectance is obtained (step S204). The approximate paper type-searching unit 335 obtains the threshold Th1 of the paper white approximation degree in spectral reflectance, stored in the threshold storage unit 343.

Next, it is determined whether the paper white approximation degree in spectral reflectance is not more than the threshold (step S205). The paper type approximation-determining unit 336 determines whether the paper white approximation degree A1 in spectral reflectance is not more than the threshold Th1. As illustrated in FIG. 6B, when the paper white approximation degree A1 is not equal to or less than the threshold Th1, or the paper white approximation degree A1 is more than the threshold Th1 (step S205: NO), the paper type approximation-determining unit 336 determines that the selected registered profile has a paper type not the same or similar to the paper type of the document, and the process proceeds to step S212.

Whereas, when the paper white approximation degree in spectral reflectance is not more than the threshold (step S205: YES), the paper type approximation-determining unit 336 determines that the selected registered profile has a paper type the same as or similar to the paper type of the document. In this configuration, the scanner response value of the paper white portion associated with the registered profile is obtained (step S206). The approximate paper type-searching unit 335 obtains the scanner response value of the white paper portion associated with the selected registered profile.

Next, a paper white approximation degree is calculated comparing the scanner response values (step S207). The paper type approximation-determining unit 336 compares the scanner response value obtained by the scanner response value-obtaining unit 332, and the scanner response value of the paper white portion associated with the selected registered profile, and calculates the paper white approximation degree A2 in scanner response value, based on the mathematical formula (2).

Next, a threshold of the paper white approximation degree in scanner response value is obtained (step S208). The approximate paper type-searching unit 335 obtains the threshold Th2 of the paper white approximation degree in scanner response value, stored in the threshold storage unit 343.

Next, it is determined whether the paper white approximation degree in scanner response value is not more than the threshold (step S209). When the paper white approximation degree A2 is not equal to or less than the threshold Th2, or the paper white approximation degree A2 is more than the threshold Th2 (step S209: NO), the paper type approximation-determining unit 336 determines that the selected registered profile has a paper type not the same as or similar to the paper type of the document, and the process proceeds to step S212.

Whereas, when the paper white approximation degree in scanner response value is not more than the threshold (step S209: YES), the paper type approximation-determining unit 336 determines that the selected registered profile has a paper type the same as or similar to the paper type of the document. In this configuration, the paper type approximation-determining unit 336 sets the creation flag to "0" (step S210).

In the present embodiment, in step S201, the creation flag is set to "1" as the initial value. When the profiles having a paper type the same as the paper type of the document are searched, and a profile having a paper type the same as or similar to the paper type of the document is found, a profile does not need to be created, so that the paper type approximation-determining unit 336 sets the creation flag to Next, the paper type is registered in the paper white approximation list (step S211). Since the paper type of the document are the same as or similar to the paper type of the selected registered profile, a paper type number of the selected registered profile is registered to the paper white approximation list. At that time, the paper white approximation degrees A1 and A2 can be stored together with the paper type number of the selected registered profile. Accordingly, even if a plurality of paper types are registered in the paper white approximation list, a registered profile of a paper type having the minimum paper white approximation degrees A1 and A2, or a paper type most similar to the paper type of the document can be selected from the registered paper types. It is noted that the paper type number of the registered profile having the minimum paper white approximation degrees A1 and A2 may be registered in the paper white approximation list.

Next, it is determined whether the spectral reflectance and the scanner response value of the paper white portion are compared with those of all the registered profiles (step S212). When the spectral reflectance and the scanner response value are compared with those of all the registered profiles (step S212: YES), the process proceeds to step S104 of the main flowchart (RETURN).

Whereas, the spectral reflectance and the scanner response value are not compared with those of all the registered profiles (step S212: NO), the process returns to step S202.

In the process of FIGS. 6A and 6B having been described above, the spectral reflectance and the scanner response value of the paper white portion of the document are compared with the spectral reflectance and the scanner response value associated with the registered profile, and it is determined whether the paper type the same as or similar to the paper type of the document is registered. When the paper type the same as or similar to the paper type of the document is registered, a registered profile corresponding to the paper type the same as or similar to the paper type of the document is selected. Whereas, when the paper type the same as or similar to the paper type of the document is not registered, it is determined that a new profile needs to be created corresponding to the spectral reflectance and the scanner response value of the paper white portion of the document.

Figure 7:
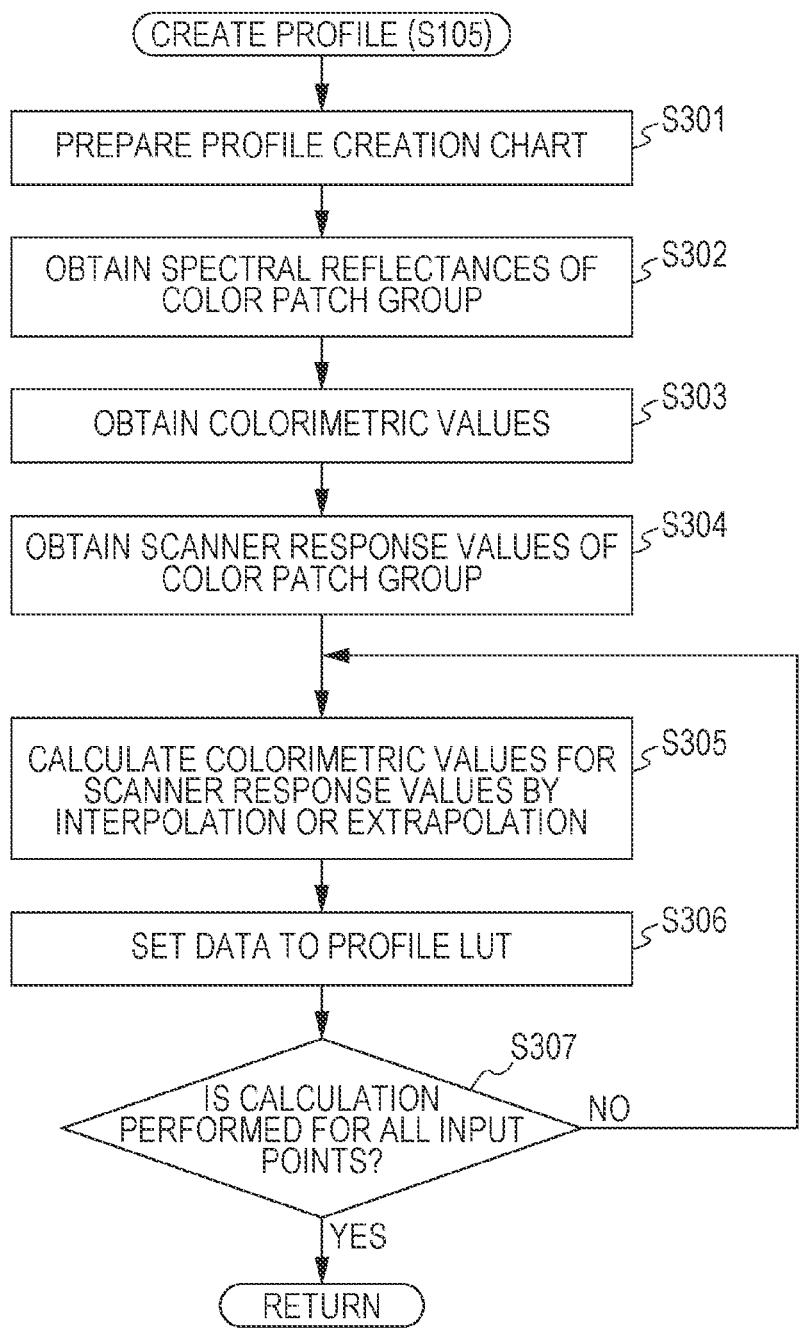
FIG. 7 is a subroutine flowchart of a process (S105) of the main flowchart illustrated in FIG. 5, illustrating the process of creating a profile.

The process (S105) of creating the profile will be described below with reference to FIG. 7. FIG. 7 is a subroutine flowchart of a process (S105) of the main flowchart of FIG. 5, illustrating the process of creating the profile.

First, a profile creation chart is prepared (step S301). The profile creation unit 334 directs the image forming unit 320 to output the profile creation chart. The output profile creation chart is conveyed to the input unit 310.

Next, spectral reflectances of a color patch group are obtained (step S302). The spectral reflectance-obtaining unit 331 controls the spectrophotometry unit 311 to obtain the spectral reflectances of the color patch group (several hundred patches) of the profile creation chart.

Next, colorimetric values are obtained (step S303). The profile creation unit 334 calculates the colorimetric values based on the obtained spectral reflectances.

Next, scanner response values of the color patch group are obtained (step S304). The scanner response value-obtaining unit 332 controls the scanner 312 to obtain the scanner response values of the color patch group of the profile creation chart.

Next, colorimetric values are calculated for the scanner response values by interpolation or extrapolation (step S305). The profile creation unit 334 calculates the colorimetric values for input points of a profile LUT by interpolation or extrapolation.

Next, data is set to the profile LUT (step S306). The profile creation unit 334 calculates the colorimetric values for the input points of the profile, for example, total 18×18×18 points of 18 RGB matrix, and sets data.

Next, it is determined whether calculation is performed for all of the input points (step S307). The profile creation unit 334 determines whether calculation is completed for all of the input points. When the calculation is completed for all of the input points (step S307: YES), the process proceeds to step S106 of the main flowchart of FIG. 5.

Whereas, when the calculation is not completed for all of the input points (step S307: NO), the process returns to step S305.

According to the color conversion method, the color conversion program, and the recording medium of the present embodiment having been described above, the following effects are achieved.

In the present embodiment, both of the spectral reflectance obtained by measuring the paper white portion by the spectrophotometer, and the scanner response value obtained by reading the paper white portion by the scanner are used to determine whether a profile needs to be created, so that it is reliably determined whether a profile needs to be created. Accordingly, color reproducibility can be satisfactorily secured in the color conversion processing, while inhibiting the increase of the processing time for creation of a profile. Further, it is prevented to create an unnecessary profile, although a similar registered profile exists.

Second Embodiment

In the first embodiment, a description has been made of the determination of whether a new profile needs to be created based on the spectral reflectance and the scanner response value of the paper white portion of the document, and the creation of the new profile according to a determination result. In a second embodiment, a description will be made of confirmation of appropriateness of determining that a new profile does not need to be created using a spectral reflectance and a scanner response value of a color patch, when it is determined that the new profile does not need to be created. It is noted that in order to prevent overlapping description, a configuration different from that of the first embodiment will be mainly described below, and description of a configuration the same as that of the first embodiment will be omitted.

Figure 8:
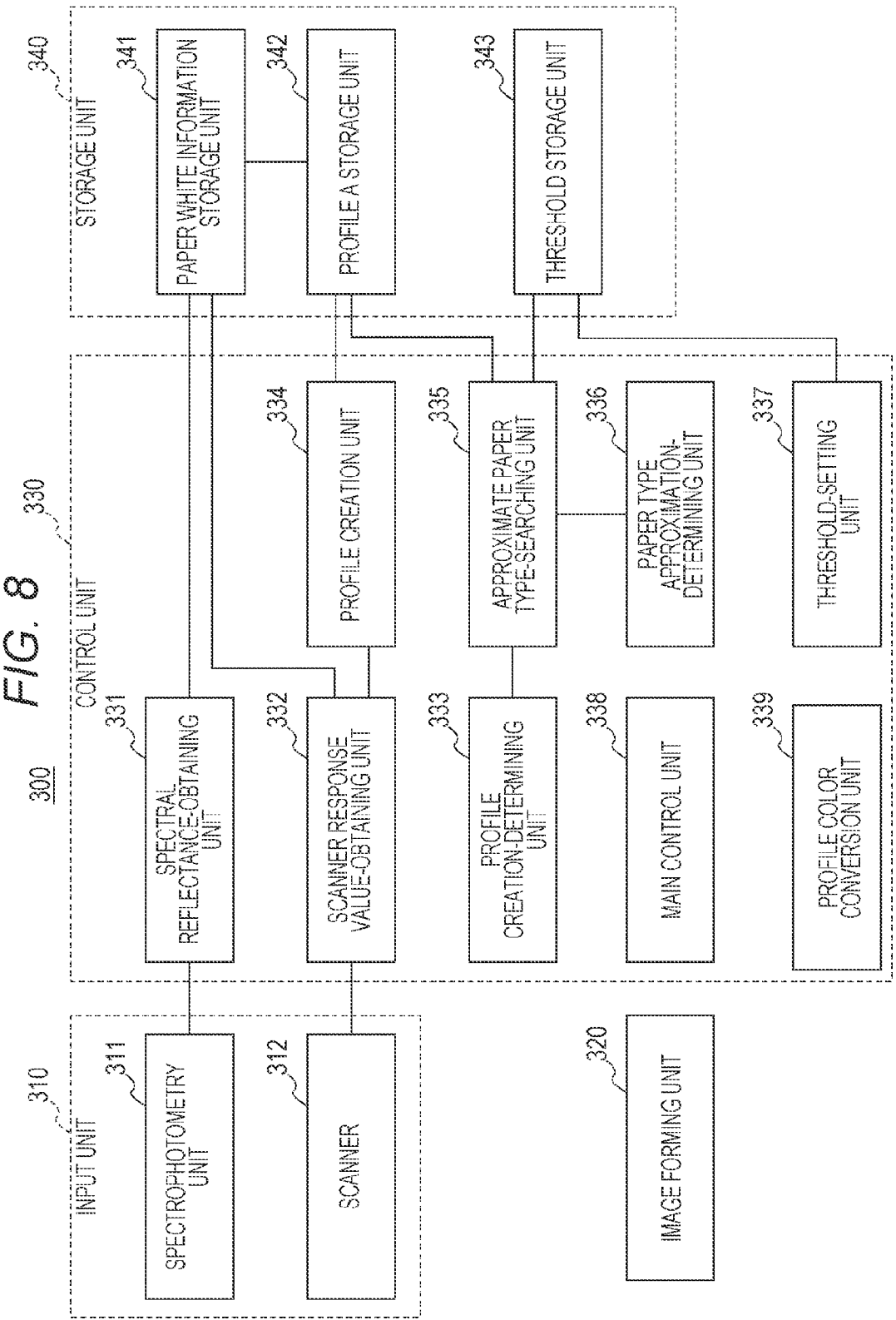
FIG. 8 is a schematic block diagram illustrating a configuration of an image forming apparatus according to a second embodiment of the present invention.
Figure 9:
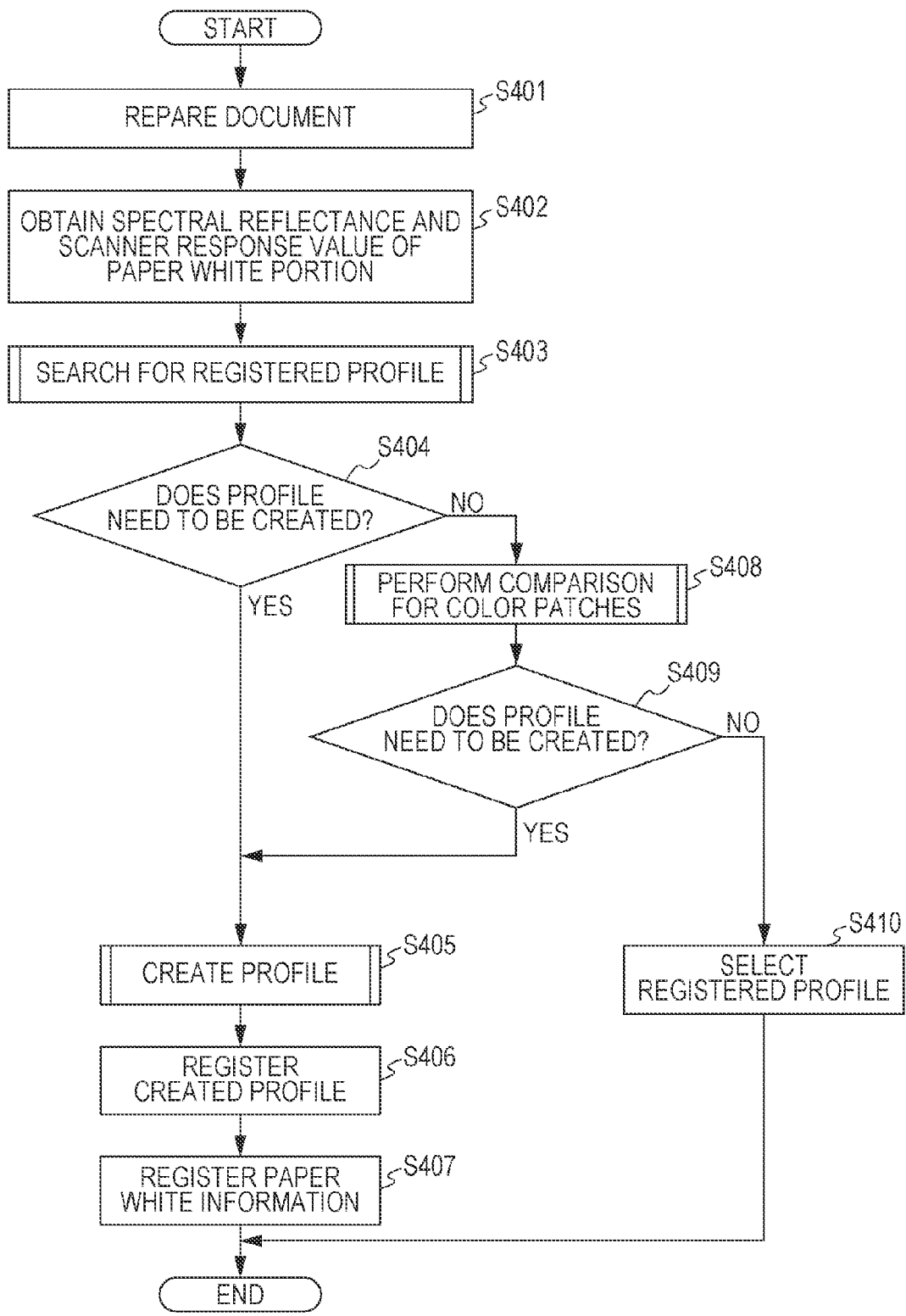
FIG. 9 is a main flowchart illustrating a color conversion method according to the second embodiment of the present invention.
Figure 10:
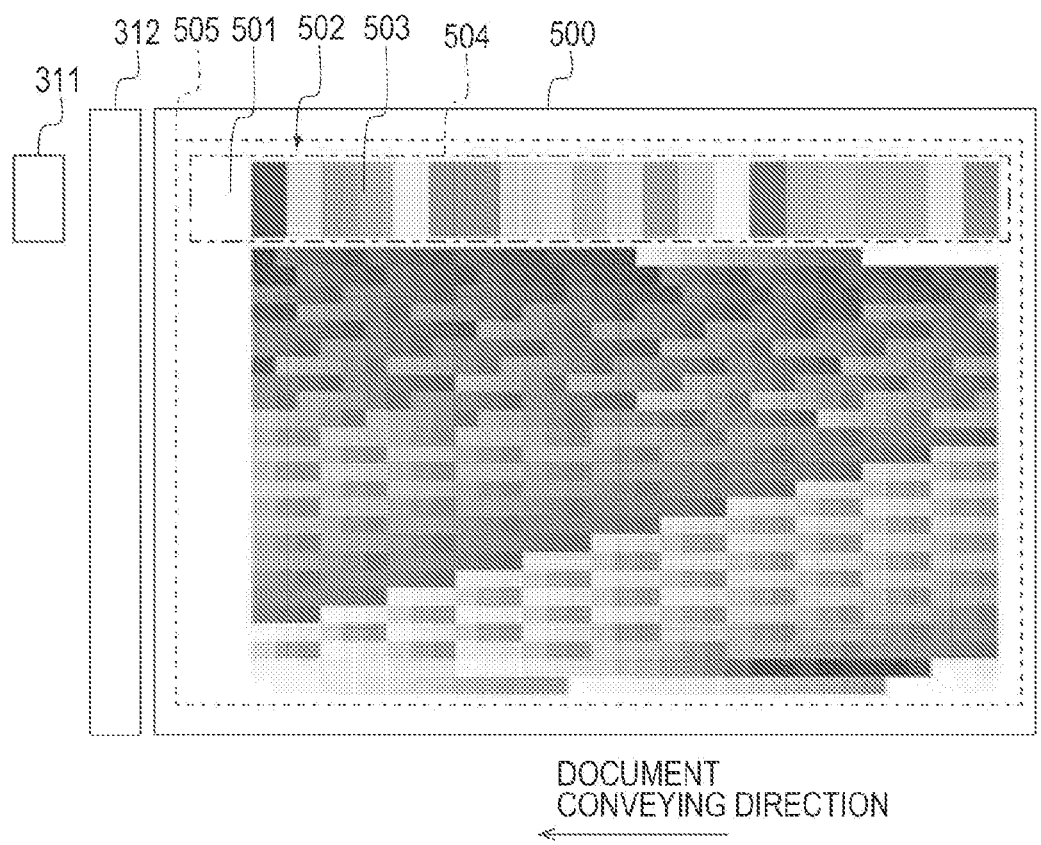
FIG. 10 is a diagram illustrating an example of a color chart as a document used in the second embodiment of the present invention.

The color conversion method, the color conversion program, and the recording medium according to the second embodiment of the present invention will be described below with reference to FIGS. 8 to 11B. FIG. 8 is a schematic block diagram illustrating the configuration of the image forming apparatus according to the second embodiment of the present invention, and FIG. 9 is a main flowchart illustrating the color conversion method according to the second embodiment of the present invention. Further, FIG. 10 is a diagram illustrating an example of a color chart as a document used in the second embodiment of the present invention.

As illustrated in FIG. 8, in the present embodiment, the control unit 330 includes a profile color conversion unit 339. The profile color conversion unit 339 uses the profile to convert the scanner response value to the colorimetric value.

A specific procedure of the color conversion method performed by the image forming apparatus 300 according to the present embodiment is as follows.

As illustrated in FIG. 9, first, a document is prepared (step S401). The main control unit 338 controls a conveyance device (not illustrated) or the like to convey the document to the input unit 310 based on the print setting information received from the print controller 200.

As illustrated in FIG. 10, the document 500 according to the present embodiment includes a paper white portion 501 and the color chart 502. The color chart 502 includes a color patch group including a plurality of color patch portions. It is noted that the color chart may be a chart for creation of the scanner profile, or a chart for adjustment of an engine, such as calibration chart.

Next, the spectral reflectance and the scanner response value of the paper white portion is obtained (step S402). The spectral reflectance-obtaining unit 331 controls the spectrophotometry unit 311 to obtain a spectral reflectance of the paper white portion 501 of the document 500. Further, the scanner response value-obtaining unit 332 controls the scanner 312 to obtain the scanner response value of the paper white portion 501 of the document 500.

The document 500 is conveyed toward the spectrophotometry unit 311 and the scanner 312 of the input unit 310, along a document conveying direction. The spectrophotometry unit 311 measures and obtains the spectral reflectances of a spectrophotometer-readable range 504 including the paper white portion 501 and the color patch portions 503, when the document 500 passes. Additionally, the scanner 312 reads a scanner-readable range 505 including the paper white portion 501 and the color chart 502 to obtain the response values.

Next, a registered profile is searched for (step S403). The process of searching for the registered profile is similar to that of the first embodiment, and detailed description thereof will be omitted.

Next, it is determined whether a profile needs to be created (step S404). The profile creation-determining unit 333 determines whether a new profile needs to be created based on a result of searching for a registered profile.

When it is determined that the profile needs, to be created (step S404: YES), the profile is created (step S405), the created profile is registered (step S406), and paper white information is registered (step S407). The process of steps S405 to S407 is the same as the process of steps S105 to S107 of the first embodiment, and description thereof will be omitted.

Whereas, when it is determined that the profile does not need to be created (step S404: NO), comparison for color patches is performed (step S408). A process of the comparison for color patches will be described in detail with reference to FIGS. 11A and 11B.

Next, it is determined whether a profile needs to be created (step S409). When it is determined that the profile needs to be created (step S409: YES), the process proceeds to step S405.

Whereas, when it is determined that the new profile does not need to be created (step S409: NO), the registered profile is selected (step S410). The approximate paper type-searching unit 335 selects an optimum profile from a plurality of registered profiles 1 to N. In the present embodiment, for example, a registered profile can be selected which has minimum paper white approximation degrees A1 and A2 in spectral reflectance and scanner response value, respectively. The main control unit 338 reads the selected registered profile, and sets the registered profile to be used for the color conversion processing. Then, the process of the main flowchart ends (END).

As described above, in the flowchart illustrated in FIG. 9, the spectral reflectance and the scanner response value of the paper white portion of the document is obtained, and a registered profile having a paper type the same as or similar to the paper type of the document is searched for. Then, it is determined whether a new profile needs to be created based on a result of searching for a registered profile. When it is determined that the new profile does not need to be created, the comparison for color patches is performed. As a result of the comparison for color patches, when it is further determined that the new profile does not need to be created, one registered profile is selected. Whereas, when it is determined that the new profile needs to be created, the new profile is created. The created profile is registered corresponding to the paper white information.

Figure 11A:
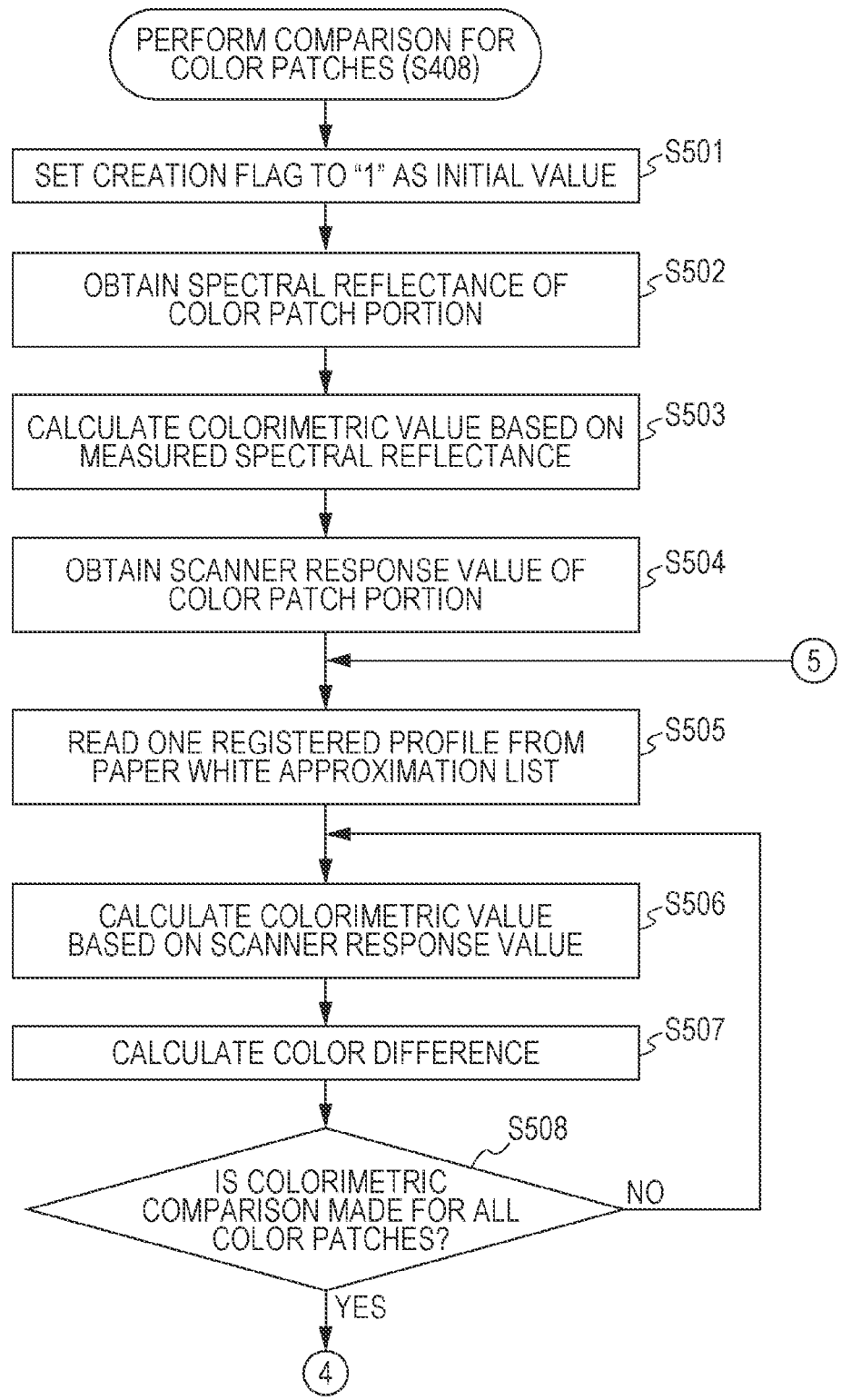
FIG. 11A is a subroutine flowchart of the main flowchart of FIG. 9, illustrating performance of comparison for color patches (S408) in detail.
Figure 11B:
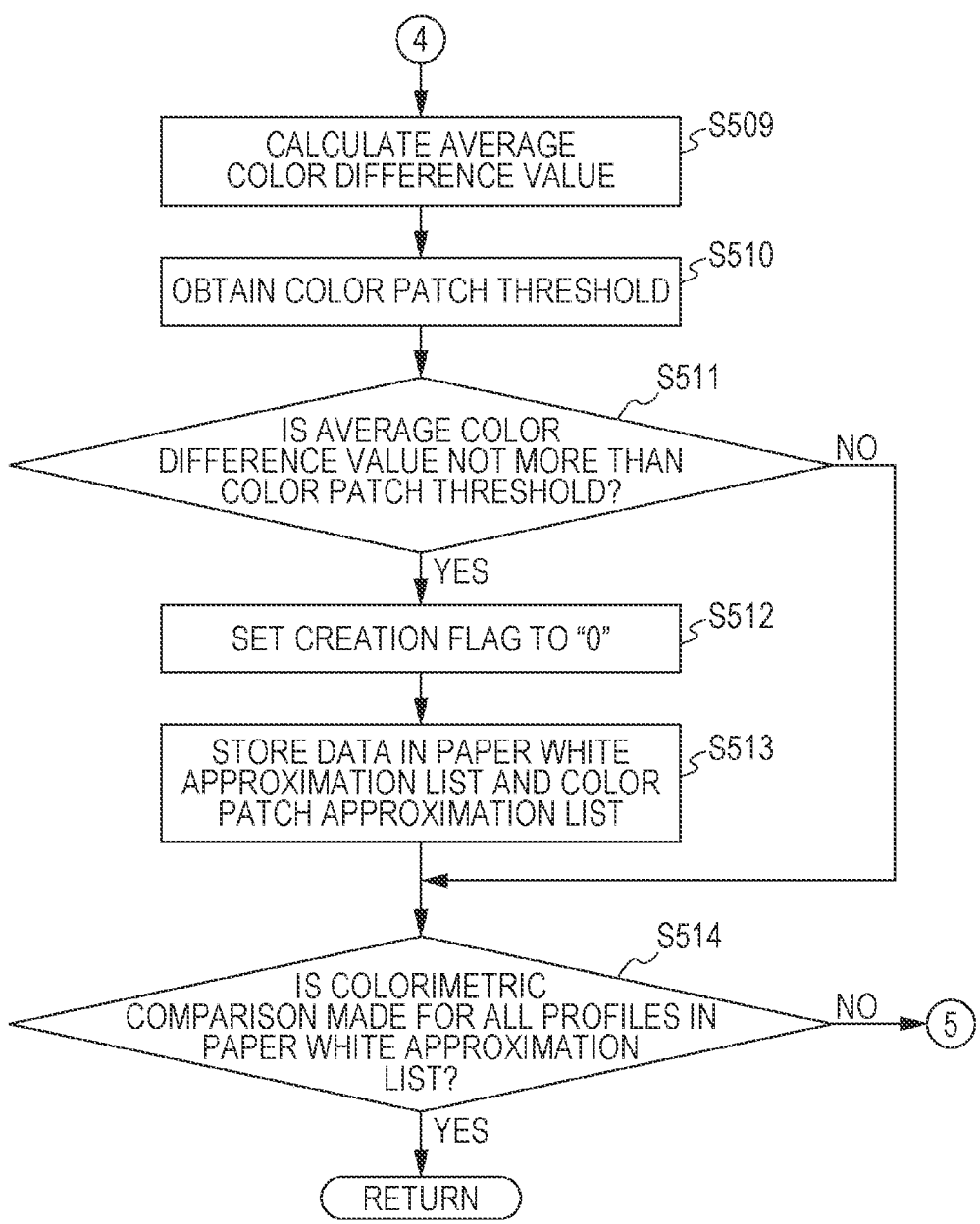
FIG. 11B is a subroutine flowchart following the subroutine flowchart of FIG. 11A.

The performance of the comparison for color patches (S408) will be described below with reference to FIGS. 11A and 11B. FIGS. 11A and 11B are a subroutine flowchart of the main flowchart of FIG. 9, illustrating performance of the comparison for color patches (S408) in detail.

As illustrated in FIG. 11A, first, the creation flag is set to "1" as the initial value (step S501). The main control unit 338 sets the creation flag to "1" as the initial value.

Next, a spectral reflectance of the color patch portion is obtained (step S502). The spectral reflectance-obtaining unit 331 controls the spectrophotometry unit 311 to measure and obtain the spectral reflectance of the color patch portion 503 of the document 500.

Next, a colorimetric value is calculated based on the measured spectral reflectance (step S503). The colorimetric value is calculated based on the spectral reflectance obtained by the measurement in step S502.

Next, a scanner response value of the color patch portion is obtained (step S504). The scanner response value-obtaining unit 332 controls the scanner 312 to obtain the scanner response value of the color patch portion 503 of the document.

Next, one registered profile is read from the paper white approximation list (step S505). The one registered profile is selected and read which has a paper type registered in the paper white approximation list in step S211.

Next, a colorimetric value is calculated based on the scanner response value (step S506). The profile color conversion unit 339 uses the registered profile read in step S505 to convert the scanner response value obtained in step S504 to the colorimetric value.

Next, color difference is calculated (step S507). The main control unit 338 calculates the color difference between the colorimetric value obtained based on the spectral reflectance measured in step S503, and the colorimetric value obtained by the conversion using the registered profile in step S506. The color difference (4E) can be calculated for example by the following mathematical formula (3). In mathematical formula (3), $L^*_1$, $a^*_1$, $b^*_1$ represent the colorimetric value calculated based on the measured spectral reflectance, and $L^*_2$, $a^*_2$, and $b^*_2$ represent the colorimetric value obtained by converting the scanner response values using the registered profile.

[Mathematical Formula 3]

$$\Delta E=(L^*_1-L^*_2)^2+(a^*_1-a^*_2)^2+(b^*_1-b^*_2)^2 \qquad (3)$$

Next, it is determined whether colorimetric comparison is made for all of the color patches (step S508). In the present embodiment, the number of color patch portions to be compared is not particularly limited, but comparison of an excessive number of color patch portions takes time, so that for example approximately one row (approximately 10 to 20 patches) is desirable. When the colorimetric comparison is not made for all color patches (step S508: NO), the process is returned to step S506.

Whereas, when the colorimetric comparison is made for all color patches (step S508: YES), an average color difference value is calculated (step S509). The main control unit 338 averages the calculated color differences of all the color patch portions to calculate the average color difference value.

Next, a color patch threshold is obtained (step S510). The main control unit 338 obtains the color patch threshold Thp from the threshold storage unit 343. It is noted that the color patch threshold Thp is preferably for example approximately 1.5.

Next, it is determined whether the average color difference value is not more than the color patch threshold (step S511). When the average color difference value is not equal to or less than the color patch threshold, or the average color difference value is more than the color patch threshold (step S511: NO), the process proceeds to step S514.

Whereas, when the average color difference value is not more than the color patch threshold (step S511: YES), the creation flag is set to "0" (step S512). The main control unit 338 determines that the colorimetric value obtained based on the spectral reflectance measured in step S503, and the colorimetric value obtained by the conversion using the registered profile in step S506 are the same as or similar to each other. That is, since the registered profile has a paper type the same as or similar to the paper type of the document, a new profile does not need to be created. Accordingly, the main control unit 338 sets the creation flag to "0".

Next, data is stored in the paper white approximation list and a color patch approximation list (step S513). Since the paper type of the document are the same as or similar to the paper type of the registered profile, the paper type number of the selected registered profile is registered to the paper white approximation list and the color patch approximation list. At that time, the paper white approximation degrees A1 and A2 and the color patch approximation degree (average color difference value) are also stored together with the paper type number. Therefore, even if a plurality of paper type are registered in the paper white approximation list and the color patch approximation list, a registered profile of a paper type having the minimum paper white approximation degrees A1 and A2 and average color difference value, or a paper type most similar to the paper type of the document can be selected from the registered paper types.

Next, it is determined whether the colorimetric comparison is made for all of the profiles in the paper white approximation list (step S514). When the colorimetric comparison is made for all of the profiles in the paper white approximation list (step S514: YES), the process proceeds to step S409 of the main flowchart (RETURN).

Whereas, when the colorimetric comparison is not made for all of the profiles in the paper white approximation list (step S514: NO), the process is returned to step S505.

As described above, in the process of the comparison for color patches illustrated in FIGS. 11A and 11B, the color difference is calculated between the colorimetric value obtained based on the measured spectral reflectance, and the colorimetric value obtained by the conversion using the registered profile in the paper white approximation list. Then, when the average color difference value as an average value between the color differences is not more than a predetermined color patch threshold Thp, it is determined that the document has a paper type the same as or similar to the paper type of the registered profile.

(Modification)

In the present modification, the thresholds Th1 and Th2 of the paper white approximation degree, and the color patch threshold Thp are adjusted based on a result of evaluation of an approximation degree of the color patch portion (the average color difference value), in addition to the paper white approximation degrees A1 and A2, Specifically, even if the paper white approximation degrees A1 and A2 are not more than the thresholds Th1 and Th2, respectively, when a large number of color patch portions have an approximation degree of more than the threshold Thp, for example, the thresholds Th1 and Th2 are adjusted to be reduced, or the color patch threshold Thp is adjusted to be increased. Accordingly, an efficient search is made of approximate registered profiles.

According to the present embodiment, the color conversion method, the color conversion program, and the recording medium having been described above have the following effect in addition to the effects of the first embodiment.

In the present embodiment, it is confirmed whether a new profile needs to be created, based on a result of comparison between the colorimetric value calculated based on the spectral reflectance obtained by measuring the color patch portion, and the colorimetric value obtained by the conversion of the scanner response value of the color patch portion using the registered profile in the paper white approximation list. Accordingly, accuracy in determination of whether a new profile needs to be created is increased.

As described above, the color conversion method, the color conversion program, and the recording medium have been described according to an embodiment of the present invention. However, it will be apparent that appropriate additions, modifications, and omissions can be made by those skilled in the art without departing from the scope of the invention.

For example, in the first and the second embodiments, the profile having the LUT form has been exemplified and described, but the profile may have a conversion formula using polynomial approximation or a matrix form (e.g., 3×3 matrix).

Further, in the first and second embodiments, the spectrophotometer and the scanner have been described which are disposed at positions along the document conveying path to obtain the spectral reflectance and the scanner response value of the paper white portion of the document conveyed on the conveying path. However, the present invention is not limited to the spectrophotometer and the scanner which are disposed at positions along the document conveying path. The present invention may use a spectrophotometer connected to the image forming apparatus, and a scanner of a reading device included in the image forming apparatus to obtain the spectral reflectance and the scanner response value of the paper white portion of the document.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A color conversion method comprising:
    a step (a) of obtaining paper white information including a spectral reflectance and a scanner response value of a paper white portion of a document,
    a step (b) of searching for a registered scanner profile corresponding to paper white information the same as or similar to the paper white information, from a plurality of registered scanner profiles for paper types, and a step (c) of determining whether a new scanner profile needs to be created corresponding to the paper white information obtained in the step (a), according to a result of searching in the step (b).

2. The color conversion method according to claim 1, wherein the step (b) further includes:

calculating a paper white approximation degree representing an approximation degree of each of the spectral reflectance and the scanner response value obtained in the step (a) with respect to a spectral reflectance and a scanner response value associated with the registered scanner profile; and comparing the paper white approximation degree and a predetermined paper white approximation degree threshold, and selecting the registered scanner profile when the paper white approximation degree is not more than the predetermined paper white approximation degree threshold.

3. The color conversion method according to claim 2, wherein in the step (c), when no registered scanner profile is selected in the step (b), it is determined that a new scanner profile needs to be created corresponding to the spectral reflectance and the scanner response value obtained in the step (a).

4. The color conversion method according to claim 2, wherein in the step (c), a scanner profile having a minimum paper white approximation degree is selected from scanner profiles of paper types having the paper white approximation degrees not more than the predetermined paper white approximation degree threshold.

5. The color conversion method according to claim 2, wherein in the step (a), a spectral reflectance and a scanner response value of a color patch portion of a color chart are further obtained in addition to the spectral reflectance and the scanner response value of the paper white portion, and the step (c) includes a step of converting the scanner response value obtained in the step (a) to a colorimetric value, using the registered scanner profile selected in the step (b), and a step of confirming whether the new scanner profile needs to be created, based on a magnitude of a color difference calculated between the colorimetric value and a colorimetric value calculated based on the spectral reflectance obtained in the step (a).

6. The color conversion method according to claim 5, wherein the step of confirming whether the new scanner profile needs to be created, includes:

calculating an average value between the color differences for a plurality of the color patch portions; and comparing the average value between the color differences and a predetermined color patch threshold, and determining that the new scanner profile does not need to be created, when the average value between the color differences is not more than the color patch threshold.

7. The color conversion method according to claim 1, further comprising a step (d) of creating a new scanner profile corresponding to the spectral reflectance and the scanner response value of the paper white portion, obtained in the step (a), when it is determined that the scanner profile needs to be created, in the step (c).

8. The color conversion method according to claim 7, further comprising a step (e) of registering the created scanner profile corresponding to the spectral reflectance and the scanner response value of the paper white portion, after the step (d).

9. The color conversion method according to claim 6, wherein the step (c) further includes adjusting the paper white approximation degree threshold and the color patch threshold according to the paper white approximation degree and the average value between the color differences.

10. The color conversion method according to claim 2, wherein the paper white approximation degree is calculated by summing up differences between the spectral reflectance obtained in the step (a) and the spectral reflectance associated with the registered scanner profile for each wavelength.

11. A non-transitory recording medium storing a computer readable color conversion program, causing an image forming apparatus to perform the color conversion method according to claim 1.

* * * * *